(12) United States Patent
Zhang et al.

(10) Patent No.: US 11,216,252 B2
(45) Date of Patent: Jan. 4, 2022

(54) HIGH-SPEED RANDOM NUMBER GENERATION METHOD AND DEVICE

(71) Applicant: Taiyuan University of Technology, Taiyuan (CN)

(72) Inventors: Jianguo Zhang, Taiyuan (CN); Qiqi Zhang, Taiyuan (CN); Yuncai Wang, Taiyuan (CN); Anbang Wang, Taiyuan (CN); Pu Li, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 288 days.

(21) Appl. No.: 16/486,241

(22) PCT Filed: Nov. 26, 2018

(86) PCT No.: PCT/CN2018/000397
§ 371 (c)(1),
(2) Date: Aug. 15, 2019

(87) PCT Pub. No.: WO2019/169514
PCT Pub. Date: Sep. 12, 2019

(65) Prior Publication Data
US 2021/0334073 A1    Oct. 28, 2021

(30) Foreign Application Priority Data
Mar. 8, 2018 (CN) .......................... 201810188892.0

(51) Int. Cl.
*G06F 7/58* (2006.01)
(52) U.S. Cl.
CPC .................................. *G06F 7/588* (2013.01)
(58) Field of Classification Search
CPC ........................................................ G06F 7/588
See application file for complete search history.

(56) References Cited

U.S. PATENT DOCUMENTS

| 7,389,316 B1 * | 6/2008 | Baetoniu | G06F 1/02 |
| | | | 708/250 |
| 9,213,835 B2 * | 12/2015 | Lesea | G06F 21/755 |
| 10,078,492 B2 * | 9/2018 | Salman | G09C 1/00 |

FOREIGN PATENT DOCUMENTS

| CN | 105138307 A | 12/2015 |
| CN | 205015881 U | 2/2016 |

(Continued)

OTHER PUBLICATIONS

PCT/CN2018/000397, International search report and written opinion of the International Searching Authority dated Mar. 4, 2019.

*Primary Examiner* — Chuong D Ngo
(74) *Attorney, Agent, or Firm* — Zhu Lehnhoff LLP

(57) ABSTRACT

The present disclosure provides a high-speed random number generation method and device, comprising an entropy source module and an entropy sampling module. The entropy source module is an autonomous Boolean network formed by digital logic gates, the network is formed by an XNOR gate and (N−1) XOR gates, wherein the value of N is equal to 3n (n is a positive integer), and the entropy source can generate chaotic signals having wide and flat frequency spectrum. The entropy sampling module of the present disclosure is formed by D flip flops used for sampling and quantizing the chaotic signals to generate random number sequences. The random number sequences generated by the present disclosure can pass test standards (NIST and Diehard statistic tests) of random number industry and have excellent random statistic characteristics. The random number generation method and device of the present disclosure are completely formed by the digital logic gates, the circuit structure is simple and is easy to be integrated, and without the need of a post processing algorithm or circuit required by a conventional random number generation device, the power consumption can be greatly reduced. The present disclosure (Continued)

can be widely applied to the fields of information security such as secure communications, key distribution, data encryption and the like.

2 Claims, 3 Drawing Sheets

(56) References Cited

FOREIGN PATENT DOCUMENTS

| | | |
|---|---|---|
| CN | 106293615 A | 1/2017 |
| CN | 108345446 A | 7/2018 |

* cited by examiner

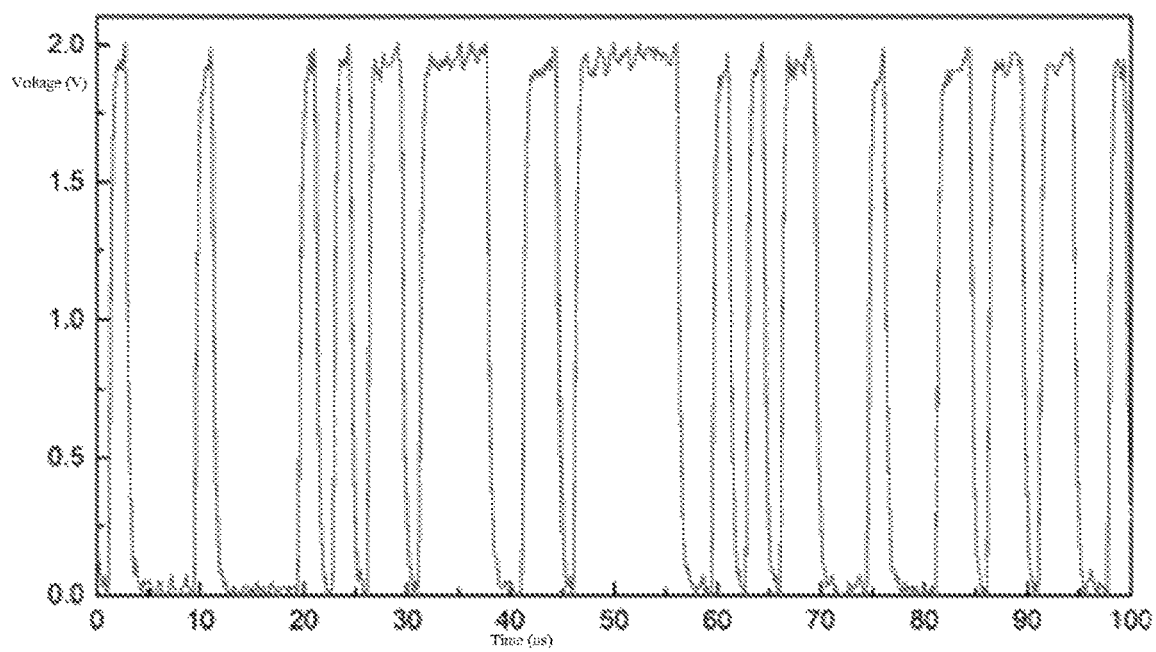

FIG. 3

| Statistical Tests | P-value | Proportion | Result |
|---|---|---|---|
| Frequency | 0.123038 | 0.992 | Success |
| Block Frequency | 0.715679 | 0.985 | Success |
| Cumulative Sums | 0.452173 | 0.994 | Success |
| Runs | 0.274341 | 0.996 | Success |
| Longest Run | 0.311542 | 0.986 | Success |
| Rank | 0.486588 | 0.990 | Success |
| FFT | 0.101311 | 0.983 | Success |
| Nonoverlapping Template | 0.626709 | 0.994 | Success |
| Overlapping Template | 0.568739 | 0.988 | Success |
| Universal | 0.823725 | 0.988 | Success |
| Approximate Entropy | 0.429923 | 0.992 | Success |
| Random Excursions | 0.660048 | 0.991 | Success |
| Random Excursions Variant | 0.624768 | 0.995 | Success |
| Serial | 0.622546 | 0.988 | Success |
| Linear Complexity | 0.304126 | 0.994 | Success |

FIG. 4

| Statistical Tests | P-value | Result |
|---|---|---|
| Birthday Spacings | 0.742382 | Success(KS) |
| Overlapping Permutations | 0.931053 | Success |
| Rank of 31x31 matrices | 0.743923 | Success |
| Rank of 32x32 matrices | 0.924107 | Success |
| Rank of 6x8 matrices | 0.595180 | Success(KS) |
| Monkey Tests on 20bit | 0.17966 | Success |
| Monkey Tests OPSO | 0.9423 | Success |
| Monkey Tests OQSO | 0.9240 | Success |
| Monkey Tests DNA | 0.1731 | Success |
| Count the 1's in a Stream of bytes | 0.376065 | Success |
| Count the 1's in specified bytes | 0.952819 | Success |
| Parking Lot Test | 0.189101 | Success(KS) |
| Minimum Distance Test | 0.974863 | Success(KS) |
| Random Spheres Test | 0.343057 | Success(KS) |
| The Squeeze Test | 0.925889 | Success |
| Overlapping Sums Test | 0.478587 | Success(KS) |
| Runs Up and Down Test | 0.282636 | Success(KS) |
| The Craps Test | 0.337318 | Success |

FIG. 5

HIGH-SPEED RANDOM NUMBER GENERATION METHOD AND DEVICE

TECHNICAL FIELD

The present disclosure relates to the field of integrated circuits, and in particular, to a high-speed random number generation method and device.

BACKGROUND

Random numbers have been significantly applied to the fields of scientific computation, digital communication, optical fiber sensing, radar ranging, identity authentication and the like. In the field of secure communications, with the rapid development of computer and network technologies, how to ensure information security becomes very important.

Currently, most of random number generation devices are to use a computer in combination with a certain deterministic mathematical algorithms (such as a linear congruence method and the like) to rapidly generate pseudo-random numbers, but the pseudo-random numbers have periodicity and can be predicted, so a pseudo-random number generator is hard to ensure the security of encrypted information.

Different from the pseudo-random numbers, physical random numbers do not have the periodicity, cannot be predicted and are really safe. Generally, the physical random numbers are generated by utilizing a natural physical random process (which calls a physical entropy source), such as circuit thermal noise, oscillator phase jitter, chaotic laser and the like.

A method for generating random numbers by utilizing the circuit thermal noise is to utilize excellent random statistic characteristics of the circuit thermal noise and to sample and quantize to generate random number sequences, but the amplitude of the thermal noise is relatively small and needs to be amplified by an amplifier, and the amplifier is not absolute linear amplification, so, randomness of an amplified noise signal will be worse. A method for generating random numbers by utilizing the oscillator phase jitter is to utilize instability of oscillator frequency and to sample and quantize a high-frequency oscillator by a low-frequency oscillator so as to generate the random number sequences, but the generated random number speed is very low; and a method for generating random numbers by utilizing the chaotic laser is to utilize noise-like and wide-frequency-spectrum characteristics of the chaotic laser, wherein the signal strength shows strong random fluctuation in the time domain and can be taken as the physical entropy source for high-speed generation of random numbers, but the device for generating the random numbers by utilizing the chaotic laser has a complex structure, comprises a plurality of optical elements and is not easy to be integrated. The above methods for generating the random numbers mostly need post processing to pass random number tests so as to cause limitations to generation and application of the random numbers.

Recently, a new physical random number generation method occurs by utilizing an autonomous Boolean network, which is a technology by utilizing non-ideal characteristics (such as deterioration effect, nonlinear time delay, short pulse suppression and the like) of logic gate devices in the autonomous Boolean network to generate a physical random process (such as phase nose or chaotic signals) and then to extract the random number sequences therefrom. Currently, a method and a device for generating the random numbers by utilizing the autonomous Boolean network mostly utilize 3-input XNOR gates and 3-input XOR gates to form the autonomous Boolean network, and in order to improve the quality of generated random numbers, a poste processing circuit is added to the structure of the method and the device. However, such solution increases circuit complexity of the random number generation device and also improves power consumption thereof.

Therefore, it is of great practical significance to provide a high-speed random number generation method and technology which have simple structure and low power consumption and are easy to be integrated, and its generated random numbers can pass through test standards of the random number industry.

SUMMARY

An objective of the present disclosure is to provide a high-speed low-power-consumption physical random number generation technology and solution in order to solve disadvantages of complex structure and great power consumption of the existing random number generation method and device.

A high-speed random number generation method of the present disclosure is achieved by utilizing the following technical solution:

a device utilized by the high-speed random number generation method comprises an entropy source module and an entropy sampling module;

(1) the entropy source module (100) has a ring topology structure formed by N nodes connected end to end, and by utilizing non-ideal characteristics of logic gates in a digital logic circuit and influence of system noise, transmission delay time between every two logic gates is different, and output of each node shows a chaotic behavior, which is taken as an entropy source; the N nodes comprise a node (102) formed by an XNOR logic gate and (N−1) nodes $(101)_{N-i}$ formed by XOR logic gates, wherein N and i are integers, the value of N is equal to 3n, n is a positive integer, and i∈(1~N−1); two input ends of each node are respectively connected with an output end of a left adjacent node and an output end of a right adjacent node; and output ends of the N nodes are connected to the entropy sampling module (200) to perform sampling and quantization; and (2) the entropy sampling module (200) samples and quantizes output signals of each node by utilizing a D flip flop; N D flip flops are configured and correspond to the N node one to one, an input end of each D flip flop is connected with an output end of one node in its corresponding entropy source module (100), a clock signal input end of each D flip flop is used for inputting a clock signal (300) and sampling and quantizing an entropy source signal according to the inputted clock signal (300), finally an output end of each D flip flop outputs random number sequences having excellent random characteristics.

The disclosure comprises the entropy source module and the entropy sampling module and is completely formed by digital logic devices so as to have simple structure and be easy to be integrally manufactured. Additionally, the entropy source module of the present disclosure is an autonomous Boolean network formed by one 2-input XNOR gate and (N−1) 2-input XOR gates, and in comparison with an autonomous Boolean network formed by 3-input XNOR gates and 3-input XOR gates, the present disclosure can greatly reduce the power consumption by utilizing the 2-input logic gates, wherein the reason lies in: one 3-input XNOR gate or one 3-input XOR gate should be respectively formed by cascading two 2-input XNOR gates or two 2-input NOR gates in principle, which means that the number of the used actual logic gates is about a half of the number of 3-input logic gates when the numbers of nodes in the autonomous Boolean networks are consistent such that the power consumption of the device can be reduced about a half; additionally, the transmission delay time of a 2-input logic gate is about a half of the transmission delay time of a 3-input logic gate such that a random number generation speed can be improved about two times, and during actual tests, a highest one-way random number generation speed of the present disclosure can be up to 1 Gbps.

A high-speed random number generation device of the present disclosure is achieved by utilizing the following technical solution:

the high-speed random number generation device comprises an entropy source module (100), an entropy sampling module (200) and an external clock for providing clock signals (300);

the entropy source module (100) has a ring topology structure formed by N nodes connected end to end, and the N nodes comprise a node (102) formed by an XNOR logic gate and (N-1) nodes $(101)_{N-i}$ formed by XOR logic gates, wherein N and i are integers, the value of N is equal to 3n, n is a positive integer, and i∈(1~N-1); two input ends of each node are respectively connected with an output end of a left adjacent node and an output end of a right adjacent node; and output ends of the N nodes are connected to the entropy sampling module (200); and the entropy sampling module (200) samples and quantizes output signals of each node by utilizing D flip flops; the N D flip flops are configured and correspond to the N node one to one, an input end of each D flip flop is connected with an output end of one node in its corresponding entropy source module (100), a clock signal input end of each D flip flop is connected with the external clock; and an output end of each D flip flop is used for outputting random number sequences having excellent random characteristics.

The entropy sampling module (200) samples and quantizes the output signals of each node by utilizing first-stage D flip flops. The entropy source module (100) is not driven by the clock signal so that there is an event that time for establishing and maintaining the sampling and the quantization of the D flip flops is not met to cause generation of metastability, thereby further improving randomness of a system.

The N nodes of the entropy source module can be singly outputted and can also be simultaneously outputted.

The entropy source module is an autonomous Boolean network, in which the ring topology structure formed by digital logic gates, is not driven by an external clock signal and can generate chaotic signals having wide and flat frequency spectrum.

The random number generation method and device are completely formed by the digital logic gates, the circuit structure is simple and is easy to be integrated, the power consumption is low, and various programmable logic circuits can be compatible.

The random number generation method and device can achieve integration miniaturization and can be widely applied to the field of information security such as secure communications and the like.

Furthermore, the clock signal is provided by the external clock signal and is less than or equal to 1 GHz.

Furthermore, the entropy sampling module is achieved by the D flip flops, each D flip flop has a clock signal input end connected with the external clock signal, and a signal input end of each D flip flop is connected with an output end of each node of the entropy source module.

The high-speed random number generation method and device provided by the present disclosure have the following advantages and positive effects:

firstly, the generated random number sequence does not have the periodicity and does not need post processing, and by adjusting clock sampling frequency, 0 to 1 Gbit/s random numbers which have excellent random characteristics and can pass international test standards (NIST and Diehard statistic tests) of random number industry can be generated;

secondly, a system completely utilizes the 2-input XNOR or XOR gates to form the ring topology structure as the entropy source, which has higher frequency and low power consumption in comparison with an entropy source formed by 3-input XNOR gates or XOR gates;

thirdly, the entropy sampling module (200) of the system samples and quantizes the output signals of each node by utilizing first-stage D flip flops. The entropy source module (100) is not driven by the clock signal so that there is an event that time for establishing and maintaining the sampling and the quantization of the D flip flops is not met to cause generation of metastability, thereby further improving randomness of a system;

fourthly, the system completely utilizes the digital logic gates, has a simple circuit structure, can be compatible with various programmable logic circuits and has general applicability and flexibility; and fifthly, the random number generation method and device can achieve integration miniaturization and can be widely applied to the field of information security such as secure communications and the like.

BRIEF DESCRIPTION OF THE DRAWINGS

FIG. 3 is a schematic diagram of 600 Mbps random number sequences generated by the device of the present disclosure;

FIG. 4 shows NIST random number testing results of 600 Mbps random numbers generated by the device of the present disclosure; and FIG. 5 shows Diehard random number testing results of 600 Mbps random numbers generated by the device of the present disclosure.

Figure 1:
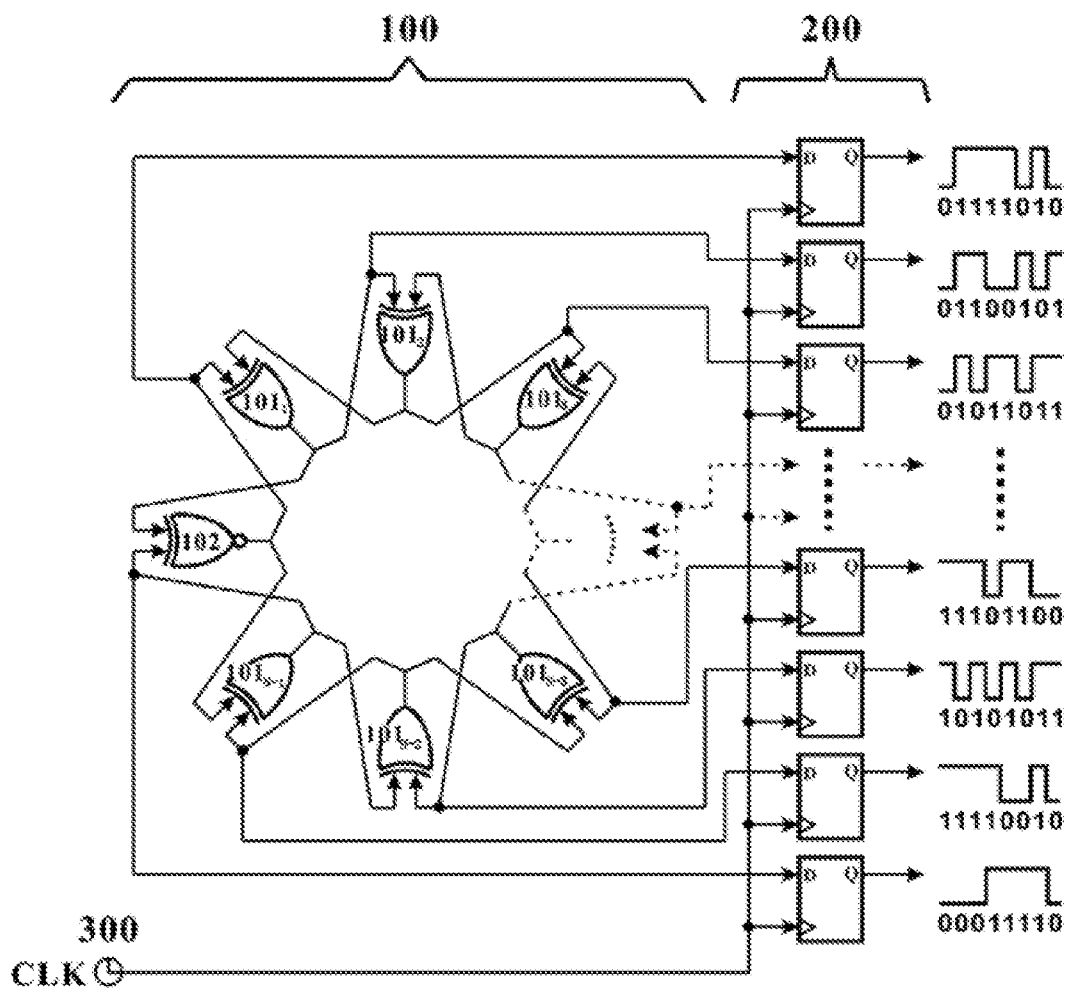
FIG. 1 is a circuit structure diagram of a device of the present disclosure.

In the drawings: 100—entropy module, 101—XOR logic gate, 102—XNOR logic gate, 200—entropy sampling module, and 300—clock signal.

DESCRIPTION OF THE EMBODIMENTS

To illustrate the basic principles, structures and advantages of the present disclosure more clearly and understandably, the following further describes the present disclosure in detail with reference to the accompanying drawings. The described contents of the embodiments are merely used to explain the present disclosure than to limit the present disclosure.

FIG. 1 is a circuit structure diagram of a high-speed random number generation method and device provided by the present disclosure, wherein the generation method comprises the following specific steps:

Step 1: utilizing non-ideal characteristics (such as deterioration effect, nonlinear time delay, short pulse suppression and the like) of logic gates in a digital logic circuit and influence of system noise to generate chaotic signal having wide and flat frequency spectrum to be an entropy source 100 through a ring topology structure formed by N nodes, wherein transmission delay time between every two logic gates is different, the value of N is equal to 3n (n is a positive integer), a node 102 of an entropy source module 100 is an XNOR logic gate while a node 101 thereof is an XOR logic gate, and two input ends of each node are respectively connected with an output end of a left adjacent node and an output end of a right adjacent node.

That is, two input ends of the XNOR logic gate 102 are connected with output ends of the XOR logic gates $101_{N-1}$ and $101_1$; two input ends of the XOR logic gate $101_1$ are connected with output ends of XNOR logic gate 102 and $101_2$; two input ends of the XOR logic gate $101_{N-1}$ are connected with output ends of XNOR logic gate 102 and $101_{N-2}$; two input ends of the XOR logic gate $101_M$ are connected with output ends of XOR logic gate $101_{M-1}$ and $101m+1$, wherein M is an integer and its value is greater than 1 and also less than N−1; and N nodes of the entropy source module 100 can be taken as output ends which are connected with an input end of the entropy sampling module 200, that is, each output end of the XNOR logic gate 102 and the XOR logic gate 101 can be taken as an output end to be connected with an input end of the entropy sampling module 200.

The entropy source module 100 is not driven by an external clock and can generate chaotic signals having wide and flat frequency spectrum through the ring topology structure, and it is not predicted due to the non-ideal characteristics of the logic gates in the digital logic circuit and the influence of the system noise.

Step 2: utilizing an external clock signal 300 to output signals to the entropy source module 100, performing sampling and quantizing by the entropy sampling module 200, and outputting random number sequences having excellent random characteristics.

The entropy sampling module 200 is completely achieved by first-stage D flip flops, each D flip flop has a clock signal input end connected with the external clock signal 300, and meanwhile, a signal input end is connected with an output end of each node of the entropy source module 100. The entropy source module 100 is not driven by the clock signal so that there is an event that time for establishing and maintaining the sampling and the quantization of the D flip flops is not met to cause generation of metastability, thereby further improving randomness of a system.

The entropy sampling module 200 performs sampling so as to be capable of obtaining the random number sequences having excellent random characteristics.

After the above steps are achieved, the random number sequences having excellent random characteristics can be obtained. The random number speed of the device of the present disclosure is associated with the frequency of the external clock signal, wherein the frequency range is less than or equal to 1 GHz; and the generated random numbers can pass test standards (NIST and Diehard statistical tests) of international random number industry without the need of post processing.

Figure 2:
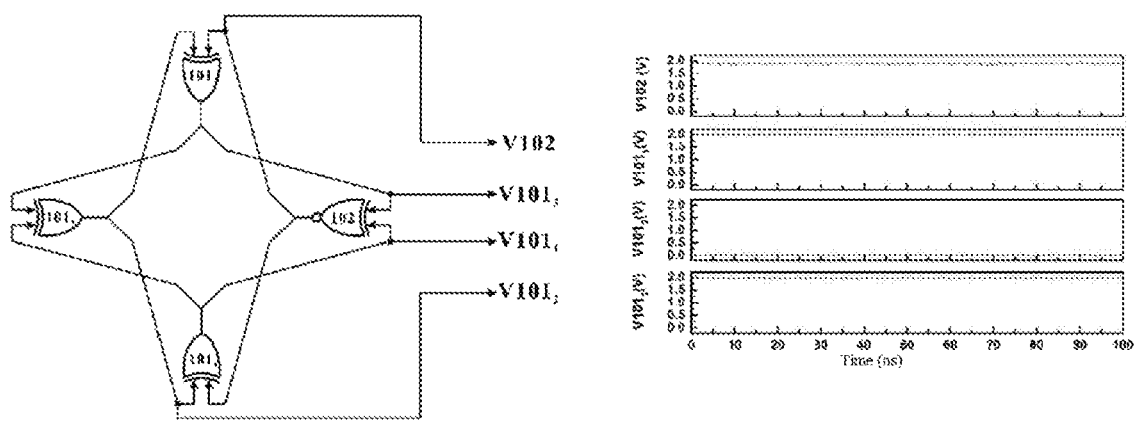
FIG. 2 is a schematic diagram of Boolean fixed points of the device of the present disclosure.

FIG. 2 is an output signal time sequence diagram of each node when the entropy source module N of the present disclosure is equal to 4 (a schematic structural diagram is arranged on the left while an output signal time sequence diagram of each node is arranged on the right). As shown in FIG. 2, when the entropy source module N is equal to 4, each node outputs steady signals and can simultaneously meet a Boolean logic algorithm of each node. High level represent 1 while low level represents 0, as shown in FIG. 2, the XNOR logic gate 102 output 1, the XOR logic gate $101_1$ outputs 1, the XOR logic gate $101_2$ output 0, the XOR logic gate $101_3$ output 1, and "1101" calls a fixed point of the entropy source module. When the value of N is not equal to 3n (n is a positive integer), the entropy source module has the fixed point so as to finally output the steady signals (namely high level or low level).

FIG. 3, FIG. 4 and FIG. 5 respectively show a diagram of 600 Mbps random number sequences generated by the device of the present disclosure and testing results of NIST and Diehard statistical tests; and in the time sequence diagram, the code is 1 when the amplitude is the high level, and the code is 0 when the amplitude is the low level.

1000 groups of 600 Mbps random number sequences having the capacity of 1 Mbit are collected to perform the NIST test. The remarkable level is 0.01, a P-value of each test is required to be greater than 0.01, and the passing rate is greater than 0.9806. The final result represents passing the random number test standard and proves that the randomness of the random numbers generated by the method is excellent.

600 Mbps random number sequences having the capacity of 1 Gbit are collected to perform the Diehard test. The remarkable level is 0.01, and a P-value of each test is required to be greater than 0.01 and less than 0.99. The final result represents passing the random number test standard and proves that the randomness of the random numbers generated by the method are excellent.

The present disclosure can be achieved on a programmable logic circuit such as CPLD, FPGA and the like, and the device of the present disclosure has low costs, the structure is simple and is easy to be integrated, and the power consumption is very low. The present disclosure can generate high-speed random numbers through parallel multiple paths, and can completely meet modern random number application requirements, in particular the field of information security such as secure communications and the like.

The foregoing embodiments merely use specific embodiments to describe the basic principles and an implementation structure of the present disclosure, and based on this, several improvements and modifications may further be made. These improvements and modifications based on the present disclosure should also be deemed as falling within the protection scope of the present disclosure.

What is claimed is:

1. A high-speed random number generation device, wherein a used device comprises an entropy source module (100) and an entropy sampling module (200); wherein
   (1) the entropy source module (100) has a ring topology structure formed by N nodes connected end to end, and by utilizing non-ideal characteristics of logic gates in a digital logic circuit and influence of system noise, transmission delay time between every two logic gates is different, and output of each node shows a chaotic behavior, which is taken as an entropy source; the N nodes comprise a node (102) formed by a 2-input XNOR logic gate and (N−1) nodes $(101)_{N-i}$ formed by 2-input XOR logic gates, wherein N and i are integers, the value of N is equal to 3n, n is a positive integer, and i∈(1~N−1); two input ends of each node are respectively connected with an output end of a left adjacent node and an output end of a right adjacent node; and output ends of the N nodes are connected to the entropy sampling module (200) to perform sampling and quantization; and
   (2) the entropy sampling module (200) samples and quantizes output signals of each node by utilizing a D flip flop; N D flip flops are configured and correspond to the N node one to one, an input end of each D flip flop is connected with an output end of one node in its corresponding entropy source module (100), a clock signal input end of each D flip flop is used for inputting a clock signal (300) and sampling and quantizing an entropy source signal according to the inputted clock signal (300), finally an output end of each D flip flop outputs random number sequences having excellent random characteristics.

2. The high-speed random number generation device according to claim 1, wherein the clock signal (300) is provided by an external clock and is less than or equal to 1 GHz.

\* \* \* \* \*